(12) United States Patent
Wacker et al.

(10) Patent No.: US 7,654,368 B2
(45) Date of Patent: Feb. 2, 2010

(54) HYBRID FASTENER

(75) Inventors: Marco Wacker, Wilhelmsdorf (DE); Joerg Russ, Altdorf (DE)

(73) Assignee: Jacob Composite GmbH, Wilhelmsdorf (DE)

( * ) Notice: Subject to any disclaimer, the term of this patent is extended or adjusted under 35 U.S.C. 154(b) by 341 days.

(21) Appl. No.: 11/485,217

(22) Filed: Jul. 12, 2006

(65) Prior Publication Data
US 2007/0040354 A1    Feb. 22, 2007

(30) Foreign Application Priority Data
Jul. 12, 2005    (DE)    .................. 20 2005 010 964 U

(51) Int. Cl.
*B65H 59/14* (2006.01)
*B64F 1/02* (2006.01)
(52) U.S. Cl. .................. 188/65.4; 188/371; 244/110 C
(58) Field of Classification Search ............. 244/110 C, 244/110 F, 110 G, 110 R; 188/65.1, 65.4, 188/65.5, 371, 374; 404/6, 9, 10
See application file for complete search history.

(56) References Cited

U.S. PATENT DOCUMENTS

| | | | | |
|---|---|---|---|---|
| 2,454,257 A | * | 11/1948 | Rowe ..................... | 244/110 R |
| 3,362,727 A | * | 1/1968 | Malherbe ................. | 280/455.1 |
| 3,382,954 A | * | 5/1968 | Charlson ............... | 188/322.16 |
| 3,466,733 A | | 9/1969 | Pajak, et al. | |
| 3,547,463 A | | 12/1970 | Eggert, Jr. | |
| 3,917,030 A | * | 11/1975 | Morley et al. ............... | 188/374 |
| 4,006,917 A | * | 2/1977 | Liehr et al. ................. | 280/451 |
| 4,304,320 A | * | 12/1981 | Hull ........................... | 188/371 |
| 4,762,208 A | * | 8/1988 | Reynier et al. ............. | 188/288 |
| 5,332,071 A | | 7/1994 | Duncan | |
| 6,135,252 A | * | 10/2000 | Knotts ........................ | 188/374 |

FOREIGN PATENT DOCUMENTS

| | | |
|---|---|---|
| DE | 2158086 | 5/1973 |
| DE | 3723681 | 1/1989 |
| DE | 4202589 | 4/1993 |
| EP | 0055364 | 7/1982 |
| WO | WO 01/59324 | 8/2001 |

* cited by examiner

*Primary Examiner*—Christopher P Schwartz
(74) *Attorney, Agent, or Firm*—Dilworth & Barrese LLP

(57) ABSTRACT

The invention relates to a hybrid fastener, in particular for the absorption of kinetic impact energy and/or for the absorption of the forces occurring on towing, in particular on towing vehicles, comprising at least one force introduction member which introduces force into the hybrid fastener and/or introduces force from the hybrid fastener into an adjacent component and comprising at least one energy absorption member which absorbs the force introduced at least in part by deformation and which is in connection with the force introduction member, with the connection between the energy absorption member and the force introduction member being made in shape-matched and/or force-transmitting manner and/or such that the energy absorption member is connected to the force introduction member with bias.

23 Claims, 4 Drawing Sheets

HYBRID FASTENER

BACKGROUND OF THE INVENTION

The present invention relates to a hybrid fastener, in particular for the absorption of impact energy and/or for the absorption of the forces occurring on the towing away, in particular the towing of motor vehicles.

Such hybrid fasteners are also known as crash members or crumple members in automotive construction. They are installed in particularly endangered regions in vehicles to absorb a substantial portion of the energy occurring on an impact and also to absorb the forces occurring on towing so that a safe towing can be ensured. Energy absorption members or hybrid fasteners are known in numerous different aspects.

A crumple member is known from DE 2 158 086 which consists of a number of tiers, layers or rows of individual members of honeycomb-shape or wave-shape. These tiers, layers or rows made up of cardboard, metal, plastic, rubber or the like are arranged perpendicular to the impact direction. A sandwich structure is known from DE 42 02 589 C2 which consists of a textile preform which is positioned with its cover layers between a stiff base plate and top plate prior to the curing of a plastic with which the preform is impregnated. A specific compression pressure is then exerted for the purpose of the connection between the top layers of the preform and the base plate or top plate. Subsequently, the spacing between the base plate and top plate is changed up to a specific alignment of the threads of the preform and finally the curing of the plastic takes place. DE 37 23 681 A1 discloses a component on a velour fabric base which has good stiffness, compressive strength and insulating effect and moreover has a low weight, which is important for use in aircraft. The cured gummed fabric has two layers between which webs extend which form rigid spacing members between the layers. The fabric consists of a technical yarn such as aramide, carbon fiber, ceramic fiber or glass fiber. The webs have the property of standing back up again after the pressing together of the layers, i.e. the component adopts its original form again. An energy absorption member for energy absorption in the case of a crash is known from EP 0 055 364 A1 which is made as an open hollow body whose jacket surface is formed by a network of at least one fiber composite. The strand layers of the fiber composite are inclined in a plurality of layers in a positive or negative direction to the longitudinal axis of the component.

Previously known fiber composites have very good crash properties, i.e. are very well suited to absorb the energy arising on an impact. However, a problem exists in the fact that they can only be connected or can only be connected with difficulty without destruction of the fibers on surrounding structures, in particular of metallic materials. An areal connection is currently realized via additional joining processes such as bonding, welding or riveting.

SUMMARY OF THE INVENTION

It is the underlying object of the present invention to provide a hybrid fastener of the initially named type which can be connected to surrounding structures in a simple manner.

This object is solved by a hybrid fastener having the features herein. Provision is accordingly made for the hybrid member to comprise at least one force introduction member, which introduces force into and/or out of the hybrid fastener, as well as at least one energy absorption member which absorbs the force introduced by deformation and which is connected to the force introduction member, with the connection between the energy absorption member and the force introduction member being made in shape-match or force-transmitting manner such that the energy absorption member is connected to the force introduction member with bias.

In this process, the at least one force introduction member can consist of or comprise a metallic material, in particular of steel or aluminum. The energy absorption member preferably consists of or comprises a fiber composite, preferably a partially cross-linked thermosetting fiber composite or a thermoplastic fiber composite.

The hybrid fastener in accordance with the invention combines the advantages of different materials such as the property of fiber composite materials to absorb energy and the property of metallic materials to introduce force into the hybrid fastener or into adjacent structures. The hybrid fastener in accordance with the invention is preferably a tension/compression composite.

The composite in accordance with the invention can be made such that the cohesion between the energy absorption member and the force introduction member is realized via an installation bias and/or by means of a shape-matched and/or force-transmitting connection.

At least one tie can be provided to generate the bias which is connected to the force introduction member or members such that the energy absorption member is under compressive strain. It is preferred for the energy absorption member to be received between two force introduction members which are tensioned by means of one tie, or preferably of a plurality of ties, and thus produce compressive strain in the energy absorbing member. The tie can be made as a rope, a bar, a hoop, a clamp or a wire. It can be made of metal or of a fiber composite such as of aramide fibers.

It is particularly advantageous for the tie or ties to be arranged such that the energy absorption member is stabilized against slipping away and is laterally supported on the transmission of forces in a transverse direction to the longitudinal axis of the energy absorption member such as occur when towing at an angle of 30° or even 70°.

Provision can be made for the tie or ties to surround or pass through the energy absorption member. The energy absorption member can be made as a compact body or as a hollow body. Any other desired aspects of the energy absorption member are also possible.

In a further aspect of the invention, two force introduction members are provided which accept the energy absorption member between them.

Provision can be made for the energy absorption member to be pressed onto the force introduction member or members areally at one or two sides while applying bias. The bias force is below the failure level of the energy absorption member in this process. The response behavior of the energy absorption member on impact is reduced by the application of a bias force such that a force peak can be prevented and a so-called triggering of the energy absorption member can be dispensed with.

Provision is preferably made for the end faces of the energy absorption member to contact the force introduction member or members. The energy absorption member can be made such that its end faces extend perpendicular to the longitudinal axis of the energy absorption member.

The shape of the force introduction member and of the energy absorption member can largely be any desired. It is feasible for the force introduction members to be designed as plates or as sections. The energy absorption member can be made as a closed section or as an open section. The energy absorption member can be rotationally symmetrical or also non-rotationally symmetrical, for example an open areal component, e.g. a head section. It can be composed of a plurality of sections.

The force introduction members are preferably made such that a simple connection to adjacent structures such as cross members or longitudinal members is possible. Assembly or disassembly by means of pin and screw connections is feasible.

It is particularly feasible for the force introduction member to be connected to the energy absorption in a shape-matched or force-transmitting manner such that the energy absorption member is surrounded at two sides by force introduction members at least sectionally, preferably in its end sections. The force introduction member can be made in two parts or have to sections and can surround the energy absorption member, for example, at its upper side and its lower side or on its inner side and outer side.

It is feasible for the energy absorption member to be pressed between the force introduction members. In the case of traction or friction connection, the composite is preferably realized such that the preferably metallic force introduction members are pressed to the energy absorption member under the action of pressure, preferably by means of high-energy processes such as high-pressure shaping, internal high-pressure shaping or electromagnetic shaping. In this process, the energy absorption member is clamped in areally by both sides.

Alternatively or additionally to the said force-transmitting connection, it is feasible for the energy absorption member also to be deformed in those sections in which the energy absorption member is surrounded by force introduction members such that a shape-matched connection between the two components results. A shape-matched connection between the energy absorption member and the force introduction member can be formed alternatively or additionally to the force-transmitting connection by also shaping the energy absorption member.

The shape-matched connection can be formed, for example, by the shaping of beads, rounded sections or holes and the like of different dimensions or diameters. To allow such a deformation of the energy absorption member, it must naturally be shapeable. Shapeability results, for example, when the energy absorption member is a partly cross-linked thermosetting fiber composite component or a thermoplastic fiber composite component.

In the case of a thermoplastic fiber composite component, a corresponding pre-heating of the fiber composite component is required under certain circumstances. If the fiber composite component melts at points in this process, the corresponding melt can act as an additional melt bonding layer and the load capability of the force-transmitting or shape-matched connection can be improved.

Provision is made in a further aspect of the invention for the energy absorption member to have at least one end face which is bonded to the force introduction member to improve the assembly bias in this manner. The energy absorption member preferably has two end faces of which each is bonded to a force introduction member, with the energy absorption member being arranged between the force introduction members.

The bonding can be realized by thermoplastic melt bonding or thermosetting reaction bonding.

The bonding can furthermore serve to stabilize the aforesaid frictional and/or shape-matched connection in that bond layers are provided between the force introduction member and the energy absorption member. This bonding can also be realized by thermoplastic melt bonding or thermosetting reaction bonding. In the case of a thermoplastic fiber composite member, the melt bond can also be realized directly by melting.

The invention further relates to a vehicle comprising a hybrid fastener. A vehicle having a cross member and a longitudinal member is preferably provided, with a hybrid fastener being located between the cross member and the longitudinal member.

BRIEF DESCRIPTION OF THE DRAWINGS

Further details and advantages of the invention will be explained in more detail with reference to an embodiment shown in the drawing. There are shown.

DESCRIPTION OF THE PREFERRED EMBODIMENTS

Figure 1:
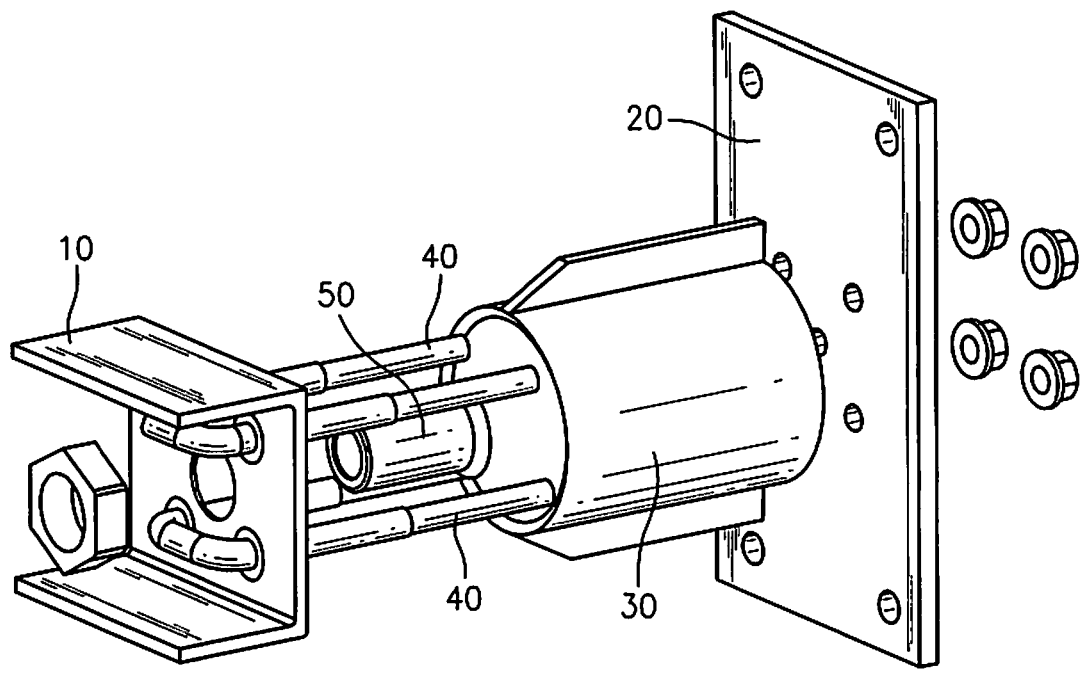
FIGS. 1, 2: perspective representations of the hybrid fastener in accordance with the invention in different embodiments with a biased energy absorption member.
Figure 2:
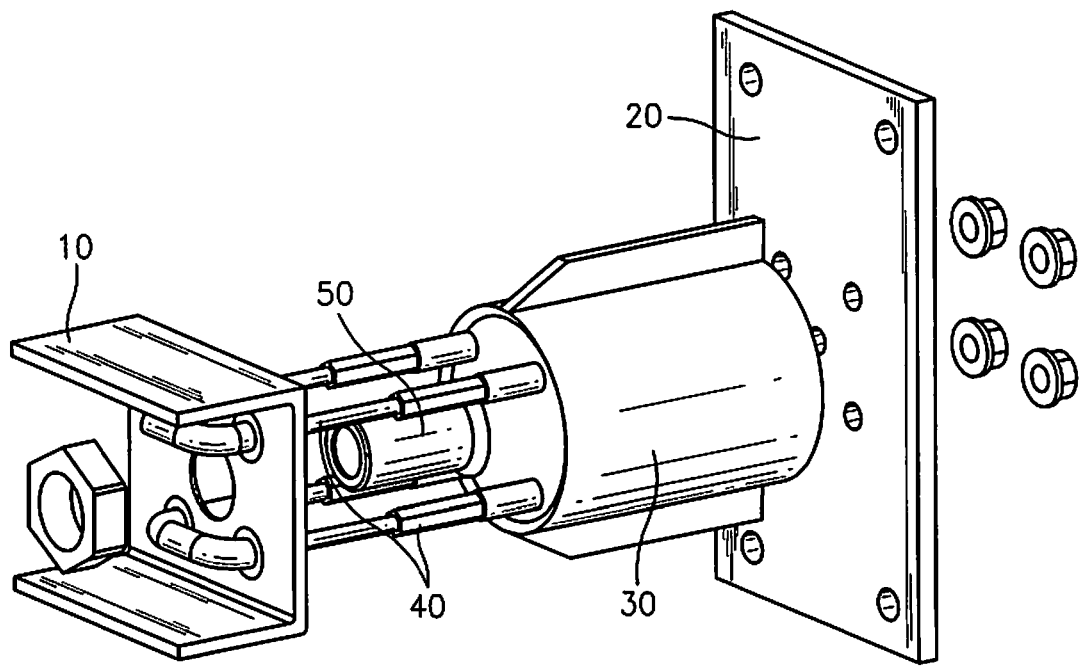

FIGS. 1 and 2 show energy absorption members or hybrid fasteners in accordance with the present invention. They consist of a tension/compression composite of different materials. The force introduction members 10, 20 consist of metal, preferably of steel or aluminum. The force introduction member 10 has the shape of a U section and the force introduction member 20 has the form of a planar plate.

The force introduction members 10, 20 are made such that a simple connection to cross members and longitudinal members of a vehicle is possible. Pin and screw connections are, for example, feasible.

The energy absorption member 30 which is substantially made as a hollow cylinder and consists of a fiber composite material and has outwardly projecting ribs which extend in the longitudinal direction extends between the force introduction members 10, 20. In the assembled state, the end faces of the energy absorption member 30 areally contact the force introduction members 10, 20. The end faces can be bonded to the force introduction members 10, 20.

Two ties 40, which are each made in U shape, extend between the force introduction members 10, 20. The limbs of each of the ties 40 pass through two respective bores of the force introduction member 10, as can be seen from FIGS. 1 and 2. The section of the tie 40 connecting the limbs of the tie is supported at the force introduction member 10 in the region between the bores. The ties 40 extend through the hollow space of the energy absorption member 30. In the other end region, the limbs of the ties 40 have threaded sections which project through bores of the force introduction member 20 in the assembled state of the energy absorption member. The threaded sections are screwed by means of nuts so that the ties 40 are also fixed relative to the force introduction member 20. A tensile strain is applied to the ties 40 by screwing the nuts to the threaded sections and a compressive strain is thereby applied to the energy absorption member 30 which is pressed between the force introduction members 10, 20 so that a frictional connection results between the end faces of the energy absorption member 30 and the force introduction members 10, 20.

The force introduction member 10 has a further bore through which the cylindrical component 50 extends which has an external thread. The component 50 has a section of larger external diameter with which the component 50 contacts the bore of the force introduction member 10. The component 50 serves for the reception of a tow hook or of another tow device in its hollow space extending in the longitudinal direction.

The bias force to be applied and generated by the ties 40 is below the failure level of the fiber composite member 30. The start behavior of the fiber composite material or component is reduced by the applied bias force in the case of loading, i.e. on a crash, such that a force peak is avoided, as can be seen from FIG. 7. FIG. 7 shows the force path curve for an energy absorption member in accordance with the prior art (thin line) from which it becomes clear that a substantial force must initially be applied to deform the energy absorption member. This does not apply to the energy absorption member or hybrid fasteners in accordance with the invention (thick line) which has a substantially continuously increasing development of the force with the deformation path.

As can be seen from FIGS. 1 and 2, the ties 40 are arranged such that they run through the hollow space of the fiber composite component 30. It would generally also be feasible for the ties 40 to surround the fiber composite component 30. The advantage can be achieved by such embodiments that the fiber composite component 30 is also stabilized against slipping with possible transverse forces such as on towing at an angle of, for example, 30° to 70°, and is mechanically supported at the side, i.e. in the direction perpendicular to its longitudinal axis, by the ties 40.

Figure 3:
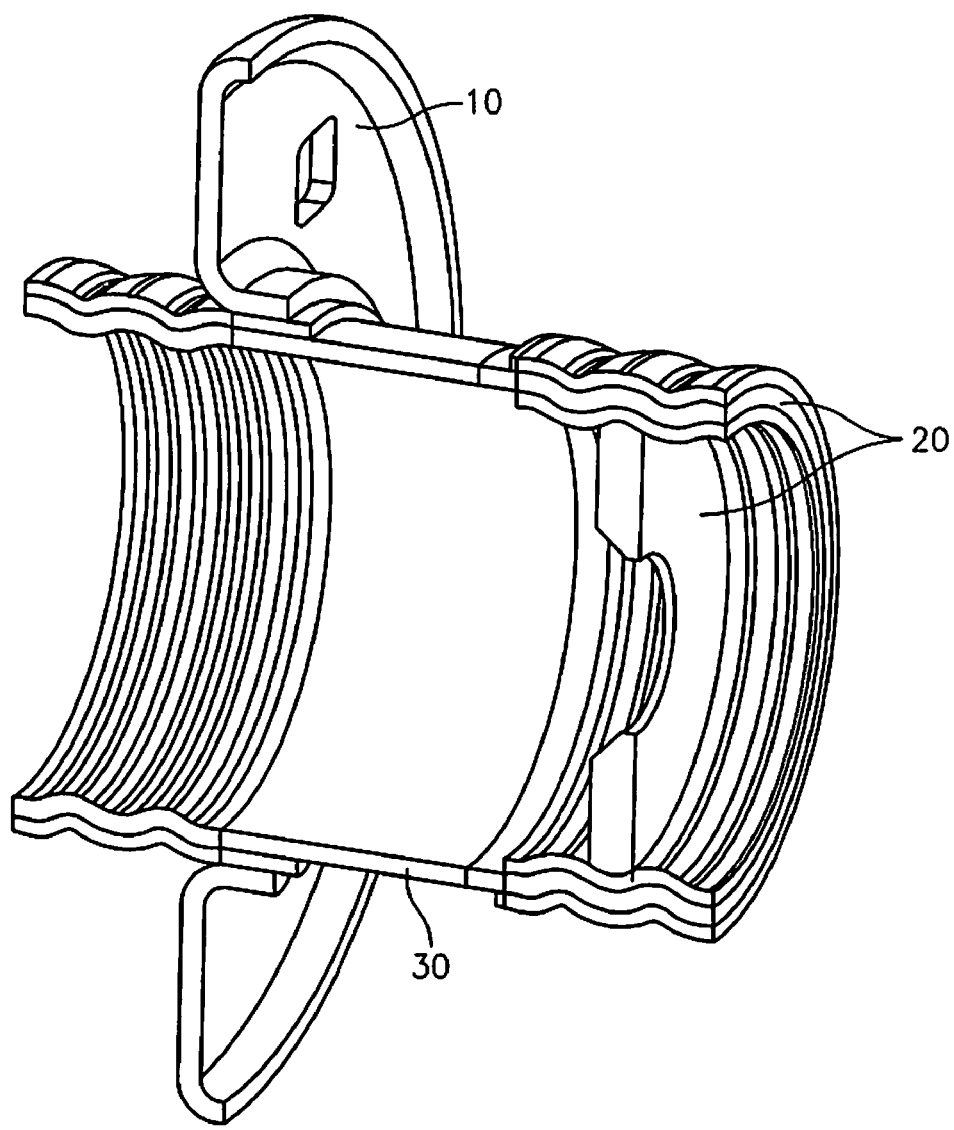
FIGS. 3-5: perspective representations of the hybrid fastener in accordance with the invention in different embodiments with an energy absorption member fixed by means of frictional retention and shape matching.
Figure 4:
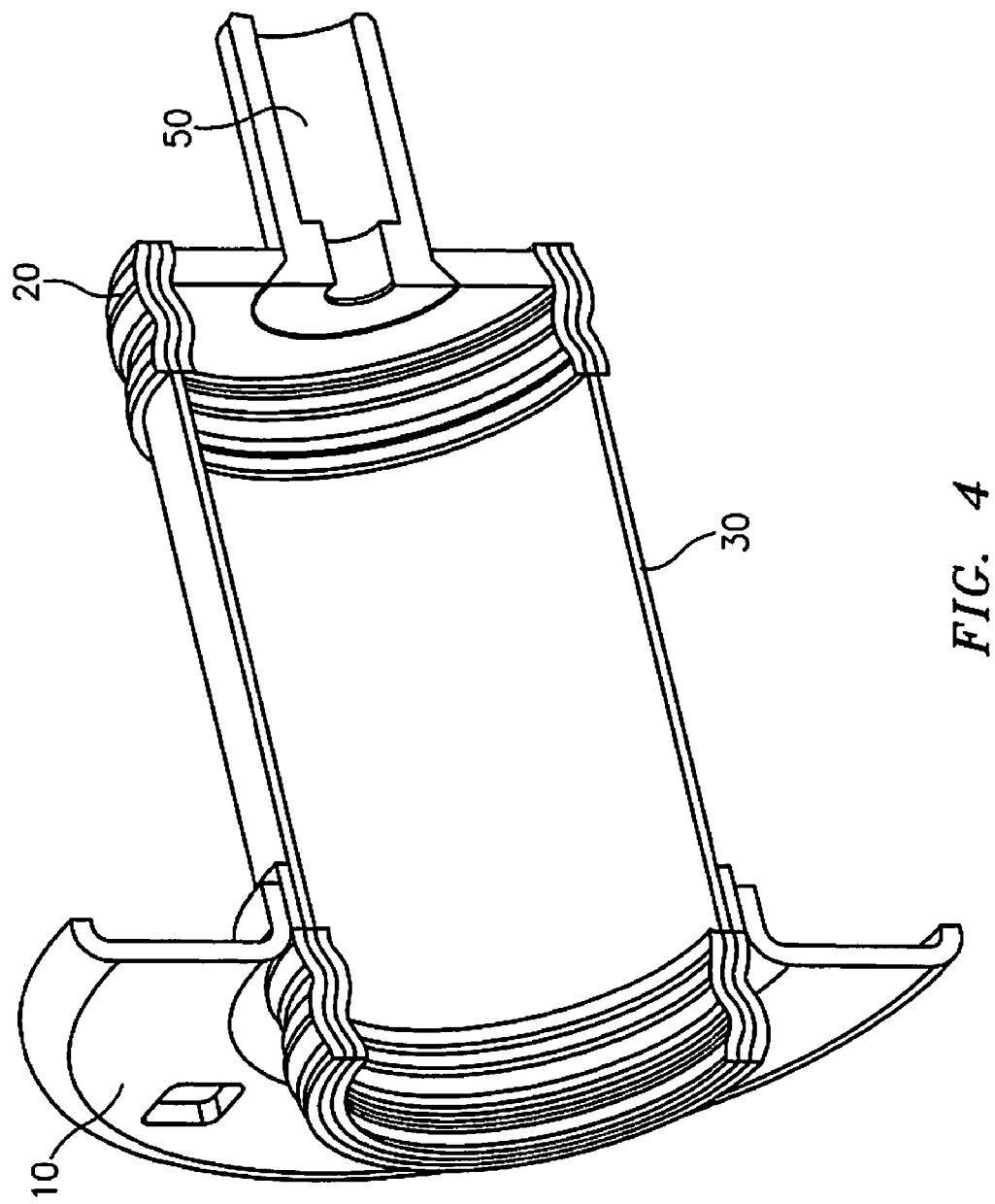

FIGS. 3 and 4 show hybrid connection members in accordance with the invention in which the connection between the energy absorption member 30 and the force introduction member 10, 20 is realized by shape-matching and force transmission. The materials used correspond to those explained with respect to FIGS. 1 and 2.

In its two end regions, the energy absorption member 30 is pressed between the force introduction member 10 and 20 on its inwardly disposed and outwardly disposed peripheral area. The force introduction members 10, 20 are each made in two parts and have an inwardly disposed part and an outwardly disposed part which areally contacts the inner side or outer side of the energy absorption member 30. The energy absorption member 30 is surrounded on both sides by force introduction members of which one is arranged on the inner side of the energy absorption member 30 and one on its outer side. The pressing between the components 10 or 20 and 30 takes part such that a force-transmitting connection results. The force transmission is modified such that a shape-matched connection is additionally obtained. This is achieved in that beads, rounded sections, etc. are shaped into the force absorption members 10, 20 and into the energy absorption member and fix the energy absorption member 30 relative to the force introduction members 10, 20.

As can be seen from FIGS. 3 and 4, the energy absorption member 30 and the force introduction members 10, 20 are cylindrical. With the force introduction member 20 shown at the right, a cylindrical component 50 is formed at the inwardly disposed part and its inner space serves the reception of a tow hook. The force introduction member 10 shown at the left has a flange at its outwardly disposed part which serves the fastening of the hybrid fastener to a further component.

Figure 5:
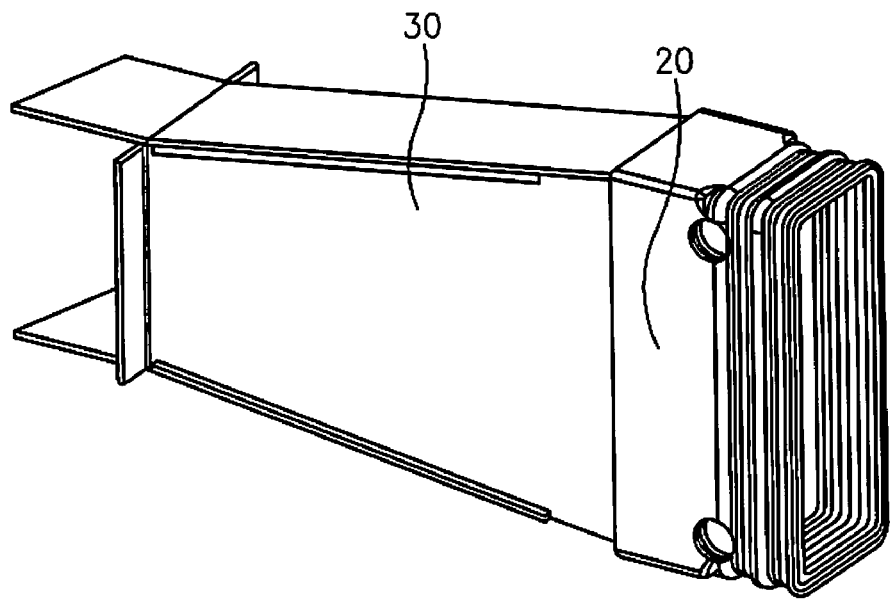
Figure 6:
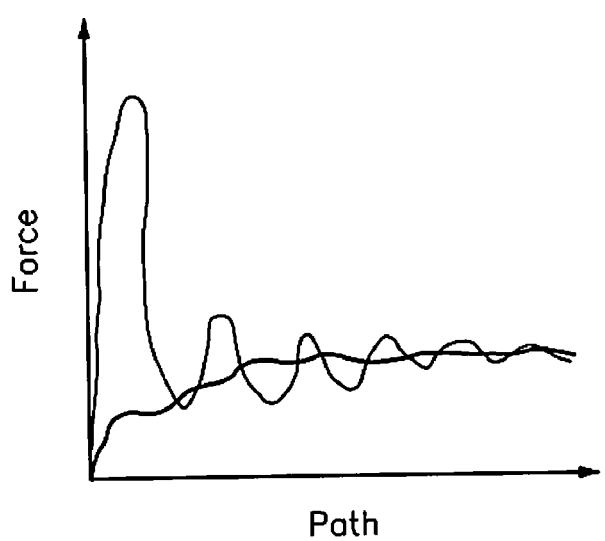
FIG. 6: a force path diagram for a hybrid fastener in accordance with the prior art and in accordance with the invention.

FIG. 5 shows a further embodiment of a force-transmitting connection to a conically converging box-shaped energy absorption member 30. There are no restrictions at all with respect to the shape of the energy absorbing member or of the force introduction member.

The invention claimed is:

1. A hybrid fastener for the absorption of kinetic impact energy or forces occurring on towing vehicles, comprising
    at least one force introduction member which introduces force into the hybrid fastener or from the hybrid fastener into an adjacent component, and
    at least one energy absorption member which absorbs the force introduced at least in part by deformation and which is in connection with the force introduction member,
    with connection between the energy absorption member and force introduction member being at least one of
    (1) shape-matched and press-fit together in complementary mating fashion,
    (2) pressed together in frictional connection and force transmitting manner, and
    (3) such that the energy absorption member is connected to the force introduction member with compressive bias.

2. A hybrid fastener in accordance with claim 1, wherein at least one tie is provided which is connected to the force introduction member or members such that the energy absorption member is under compressive strain.

3. A hybrid fastener in accordance with claim 2, wherein the tie is made as rope, bar, hoop, clamp or wire, made of metal or a fiber composite material.

4. A hybrid fastener in accordance with claim 2, wherein the ties are arranged such that the energy absorption member is mechanically supported by the ties on the transmission of forces in the transverse direction to the longitudinal axis of the energy absorption member.

5. A hybrid fastener in accordance with claim 2, wherein the tie or ties surrounds/surround or extends/extend through the energy absorption member.

6. A hybrid fastener in accordance with claim 1, wherein the force introduction member is connected to the energy absorption member in shape-matched or force-transmitting manner such that the energy absorption member is surrounded at two sides by the force introduction member in its end sections.

7. A hybrid fastener in accordance with claim 6, wherein the energy absorption member and or the force introduction member is deformed in those sections in which the energy absorption member is surrounded by the force introduction member such that a shape-matched connection results between both components.

8. A hybrid fastener in accordance with claim 7, wherein the shape-matched connection is realized by beads, rounded sections or holes.

9. A hybrid fastener in accordance with claim 6, wherein the force introduction member surrounds the energy adsorption member at its upper side and lower side or at its inner side and outer side.

10. A hybrid fastener in accordance with claim 6, wherein the energy absorption member is pressed between the components of the force introduction member.

11. A hybrid fastener in accordance with claim 1, wherein a force introduction member is configured with means for receiving an apparatus for the towing of a vehicle.

12. A hybrid fastener in accordance with claim 11, wherein the means for receiving the apparatus have a sleeve to receive a tow hook.

13. A vehicle having a hybrid fastener in accordance with claim 1.

14. A vehicle in accordance with claim 13 having a cross member and a longitudinal member, with the hybrid fastener located between the cross member and the longitudinal member.

15. A hybrid fastener in accordance with claim 1, wherein the force introduction member comprises steel or aluminum.

16. A hybrid fastener in accordance with claim 1, wherein the energy absorption member comprises a partially cross-linked thermosetting fiber composite component or a thermoplastic fiber composite component.

17. A hybrid fastener in accordance with claim 1, wherein two force introduction members are provided which accept the energy absorption member between them.

18. A hybrid fastener in accordance with claim 1, wherein the energy absorption member has a longitudinal axis; and the areas of the force introduction members which end faces of the energy absorption member contact extend perpendicular to the longitudinal axis of the energy absorption member contact extend perpendicular to the longitudinal axis of the energy absorption member.

19. A hybrid fastener in accordance with claim 1, wherein the energy absorption member is made as a closed section or as an open section.

20. A hybrid fastener in accordance with claim 1, wherein the energy absorption member has at least one area which is bonded to the force introduction member.

21. A hybrid fastener in accordance with claim 1, comprising two said force introduction members (10, 20), one (10) of which is in the shape of a U-section and the other (20) of which is in the shape of a planar plate, said energy absorption member (30) substantially in the shape of a hollow cylinder and having outwardly-projecting ribs extending in a longitudinal direction between said force introduction members (10, 20), said energy absorption member (30) areally-contacting said force introduction member (20) in the shape of a planar plate, two ties (40) each in the shape of a U extending between said force introduction members (10, 20) and through said hollow energy absorption member (30), said ties (40) extending through respective bores in said force introduction member (10) in the shape of a U-section and fixable, by screwing, to said force introduction member (20) in the shape of a planar plate, such that tensile strain is applied to said ties (40) by screwing and compressive strain is thereby applied to said energy absorption member (30) pressed between said force introduction members (10, 20) resulting in frictional connection between end faces of said energy absorption member (30) and force introduction members (10, 20), and a longitudinally-extending cylindrical component (50) structured and arranged for receiving a tow hook or another tow device in a hollow space therein and extending through a bore in said force introduction member (10) in the shape of a U-section.

22. A hybrid fastener in accordance with claim 1, wherein said energy absorption member (30) is substantially in the shape of a hollow cylinder, said force introduction members (10, 20) also being cylindrically-shaped and each formed in two-parts, a radially-inwardly-disposed part and a radially-outwardly-disposed part, respectively areally-contacting radially-inward or outward sides of said energy absorption member (30) such that said energy absorption member (30) is pressed upon said between said respective inwardly-disposed and outwardly-disposed parts of each said force introduction member (10, 20) and a force-transmitting connection results, and additionally comprising a cylindrical component (50) formed at the inwardly-disposed part of one (20) of said force introduction members (10, 20) for receiving a tow hook.

23. A hybrid fastener in accordance with claim 1, wherein said energy absorption member (30) has a conically-converging box shape.

* * * * *